United States Patent [19]

Runkel et al.

[11] Patent Number: 5,152,995
[45] Date of Patent: Oct. 6, 1992

[54] STABLE ANTIBIOTIC ESTER FEED COMPOSITIONS

[75] Inventors: Richard A. Runkel, Palo Alto; Stephen A. Berry, Saratoga; Mahmood M. Ghani, Sunnyvale, all of Calif.

[73] Assignee: Syntex (U.S.A.) Inc., Palo Alto, Calif.

[21] Appl. No.: 420,969

[22] Filed: Oct. 12, 1989

Related U.S. Application Data

[63] Continuation of Ser. No. 116,421, Nov. 3, 1987, abandoned, which is a continuation-in-part of Ser. No. 944,703, Dec. 18, 1986, abandoned.

[51] Int. Cl.$^5$ .................. A23K 1/18; A61K 9/16; A61K 31/35
[52] U.S. Cl. .................. 424/438; 424/494; 424/495; 424/498; 514/460
[58] Field of Search ............... 514/460; 424/438, 494, 424/495, 498

[56] References Cited

U.S. PATENT DOCUMENTS

| | | | |
|---|---|---|---|
| 2,206,975 | 7/1940 | Ripper | 164/14 |
| 2,585,755 | 2/1952 | Duspiva | 167/52 |
| 2,983,796 | 5/1960 | Zick | 99/109 |
| 3,019,109 | 1/1962 | Klothen | 99/2 |
| 3,157,512 | 11/1964 | Muller | 99/9 |
| 3,196,018 | 6/1965 | Galler | 99/2 |
| 3,501,568 | 3/1968 | Haney | 514/460 |
| 3,562,806 | 9/1968 | Grant et al. | 424/438 |
| 3,786,123 | 1/1974 | Katzen | 264/53 |
| 3,794,732 | 2/1974 | Raun | 424/283 |
| 3,832,358 | 8/1974 | Chamberlein | 514/460 |
| 3,855,411 | 12/1974 | Bahal | 424/176 |
| 3,857,948 | 12/1974 | Tanaka et al. | 424/283 |
| 3,867,523 | 2/1975 | Bahal | 514/970 |
| 3,907,832 | 9/1975 | Hamill | 260/345.7 |
| 3,953,474 | 4/1976 | Hamill | 260/345.7 |
| 3,985,872 | 10/1976 | Chamberlein | 424/122 |
| 3,989,723 | 11/1976 | Hamill | 260/345.7 |
| 4,048,268 | 9/1977 | Ludwig, I | 264/15 |
| 4,087,556 | 5/1978 | Harte | 426/2 |
| 4,127,647 | 11/1978 | Sato et al. | 424/494 |
| 4,394,377 | 7/1983 | Spires | 424/177 |
| 4,405,609 | 9/1983 | Potter | 424/177 |
| 4,431,665 | 2/1984 | Kluge et al. | 514/460 |
| 4,447,421 | 5/1984 | Klothen | 424/227 |
| 4,542,027 | 9/1985 | Clark | 514/459 |
| 4,925,674 | 5/1990 | Giannini et al. | 424/494 |

FOREIGN PATENT DOCUMENTS

| | | |
|---|---|---|
| 91767 | 10/1983 | European Pat. Off. |
| 5438163 | 1/1972 | Japan . |
| 84/00282 | 2/1984 | PCT Int'l Appl. |
| 1400912 | 7/1975 | United Kingdom . |
| 2108843A | 5/1983 | United Kingdom . |

OTHER PUBLICATIONS

Spires, et al., "Laidlomycin Butyrate-An Ionophore With Enhanced Intraruminal Activity", *J. Animal Science*, 57, 1553-1560 (1983).

Gutcho, M., "Animal Feeds," *Food Processing Review* No. 10, 1970, pp. 117-119.

*Primary Examiner*—Frederick E. Waddell
*Assistant Examiner*—K. Weddington
*Attorney, Agent, or Firm*—Carol J. Roth; Derek P. Freyberg; Tom M. Moran

[57] ABSTRACT

Acid-sensitive antibiotic esters for oral administration to livestock are stabilized by incorporation in premix formulations comprising a carrier, a base, a protective coating, and optionally a sealant film.

22 Claims, No Drawings

STABLE ANTIBIOTIC ESTER FEED COMPOSITIONS

This is a continuation of U.S. patent application Ser. No. 116,421, filed Nov. 3, 1987, now abandoned, which in turn is a continuation-in-part of U.S. patent application Ser. No. 944,703, filed Dec. 18, 1986, now abandoned. The complete disclosures of both patent applications are incorporated herein by reference.

BACKGROUND OF THE INVENTION

1. Field of the Invention

This invention relates to a stable livestock feed premix composition containing antibiotic esters sensitive to acid in solid formulations.

This invention also relates to method for stabilizing an acid-sensitive antibiotic ester by incorporating said ester into a feed premix composition of the invention.

2. Related Disclosure

Certain antibiotic esters are capable of increasing the feed efficiency of livestock, particularly ruminants. For example, laidlomycin propionate and its salts (described in U.S. Pat. No. 4,431,665, incorporated herein by reference in full) is known to increase the feed efficiency of livestock, e.g., swine, poultry, and ruminants, and also to control coccidial infections in livestock, including horses, cattle, poultry, swine, goats and sheep. Such antibiotic esters are preferably administered orally, in either the subject animal's feed or drinking water. When medicaments are to be administered to livestock orally, they are usually first formulated in a "premix," which is then mixed into the livestock's regular feed mixture.

However, certain antibiotic esters are unstable to the acidic conditions usually present in animal feed and premixes. It has now been discovered that, for example, laidlomycin propionate and its salts are most stable in slightly acidic solutions (pH 4-6), but is most stable in solid formulations under basic conditions (pH about 11). We have now discovered that the compositions of the invention economically and effectively stabilize and protect such acid-sensitive antibiotic esters, allowing the incorporation of antibiotics such as laidlomycin esters in livestock feed without the loss of activity.

SUMMARY OF THE INVENTION

One aspect of the invention is a stable livestock feed premix which comprises an acid-sensitive antibiotic ester, a base, a protective coating, and optionally a suitable premix carrier and a sealant film.

Another aspect of the invention is a method for stabilizing acid-sensitive antibiotic esters, by granulating said esters with a base and a suitable premix carrier to form a first granulate, and coating said first granulate with a protective coating.

DETAILED DESCRIPTION AND PREFERRED EMBODIMENTS

One aspect of the invention is a stable livestock feed premix composition which comprises an acid-sensitive antibiotic ester, a base, a protective coating, optionally a suitable premix carrier, and optionally a sealant film. A preferred subgenus of the invention is the composition wherein said formulation comprises between about 0.001% to 25% antibiotic ester, about 10% to about 40% base, about 10% to about 50% protective coating, about 0% to about 50% carrier, and 0% to about 8% sealant film, especially where said acid-sensitive antibiotic ester is a laidlomycin acylate, particularly laidlomycin propionate, or its veterinarily acceptable salts. A preferred class of the invention is the composition wherein said formulation comprises between about 5 to 20% antibiotic ester, about 25% to about 40% base, about 30% to about 40% protective coating, about 0% to about 50% carrier, and about 0% to about 8% sealant film, particularly where said base is calcium hydroxide, sodium hydroxide, or potassium hydroxide. A preferred subclass of the invention is the composition wherein said protective coating is a mixture of hemicelluloses, lignins, lignosulfonates, starch or sucrose, especially a hemicellulose mixture such as Masonex ®. A presently preferred embodiment of the invention is the composition which comprises about 5–20% laidlomycin propionate potassium salt, about 30–40% dry Masonex ®, about 0–8% petrolatum, mineral oil, or stearyl alcohol, about 30–40% Ca(OH)$_2$, and the remainder soybean mill run.

Another aspect of the invention is a method of enhancing feed efficiency or treating coccidial infection in livestock, which method comprises: orally administering a medicated feed containing a feed premix comprising an effective amount of an acid-sensitive antibiotic ester; a suitable premix carrier; an amount of veterinarily acceptable base sufficient to raise the premix pH to an antibiotic ester-stabilizing pH; and an amount of suitable protective coating material sufficient to coat said antibiotic ester, premix carrier, and base. A preferred class of the invention is the method wherein said antibiotic ester is an acylate of laidlomycin, or a veterinarily acceptable salt thereof, especially where said premix carrier is soy bean mill run or calcium carbonate, particularly where said base is calcium hydroxide, sodium hydroxide, or potassium hydroxide. A preferred subclass is the method wherein said protective coating is lignosulfonate, hemicellulose, starch or sucrose, particularly where said protective coating is hemicellulose. A presently preferred embodiment is the method in which the premix further comprises an amount of veterinarily acceptable sealant material sufficient to coat said antibiotic ester, premix carrier, base, and protective coating material, particularly where said sealant film is stearyl alcohol or glyceryl monostearate.

Premixes of the invention may also include optional ingredients such as tackifiers, antioxidants, vitamins, anthelmintics, preservatives, colorings, flavorings, minerals, other dietary supplements, and the like.

DEFINITIONS

The term "acid-sensitive antibiotic ester" refers to antibiotic esters and their veterinarily acceptable salts which are acid-labile in animal feed and are suitable for administration to livestock. Acid-sensitive antibiotic esters are antibiotic esters suitable for administration to livestock which are hydrolyzed under the acid conditions normally present in animal feed. Acid-sensitive antibiotic esters are generally most stable in solution at pHs of about 4 to about 10, but are more rapidly degraded at lower or higher pH. Such antibiotic esters are generally administered to ruminant livestock to increase feed efficiency, and may be administered to poultry to treat coccidiosis. Preferred antibiotic esters are laidlomycin acylates, particularly the acetate, propionate, butyrate, and phenylcarbamate. Laidlomycin acylates and their preparation and administration are described in U.S. Pat. No. 4,431,665 and U.S. Pat. No. 4,542,027, both of which are incorporated herein by reference in full.

The term "veterinarily acceptable salts" refers to non-toxic salts of an antibiotic ester with an appropriate cation suitable for oral administration to livestock, for example an alkali or alkaline earth cation. Presently preferred salts are laidlomycin propionate potassium salt, laidlomycin propionate sodium salt, laidlomycin propionate calcium salt, laidlomycin propionate cholate salt, and the like, particularly laidlomycin propionate potassium salt.

The term "veterinarily acceptable" as applied to components of the premix of the invention means that the component specified is acceptable for administration to livestock, particularly oral administration. "Veterinarily acceptable" encompasses compounds which may be employed in animals, even if not acceptable for use in humans. For example, calcium hydroxide would not be considered an acceptable carrier for pharmaceutical use, but is perfectly acceptable for use in veterinary applications.

The term "antibiotic ester-stabilizing pH" refers to a pH sufficiently high to stabilize an acid-sensitive antibiotic ester in the solid phase.

The term "effective amount" refers to the amount of antibiotic ester needed to effect the result desired. For example, the effective dosage of laidlomycin esters for increasing the feed efficiency of ruminants is generally between about 0.1 and 1.0 mg/Kg/day body weight, preferably from about 0.3 to about 0.8 mg/Kg/day. An effective dose for increasing the feed efficiency of swine is generally between about 0.1 and 10 mg/Kg/day body weight, preferably from about 1.0 to about 5.0 mg/Kg/day. (Feed premixes for swine are preferably formulated at a laidlomycin ester concentration of about 10 to 100 mg/Kg of feed.) The effective dosage of laidlomycin esters for treating coccidial infections in livestock is generally between about 0.1 and 3.0 mg/Kg/day.

The term "base" as used herein refers to veterinarily acceptable bases which are capable of raising the pH of the premix formulation to an alkalinity at which the acid-labile antibiotic ester is stable, such as calcium hydroxide, sodium hydroxide, potassium hydroxide, sodium acetate, calcium carbonate, trisodium phosphate, triethanolamine, magnesium hydroxide, magnesium carbonate, sodium carbonate, and the like. The preferred pH of the final premix formulation is between about 8 and about 12, preferably about 9-12, most preferably about 11.

The term "livestock" as used herein refers to cattle, horses, poultry, swine, goats, sheep, and the like. It is to be appreciated that the premix of the invention is also suitable for administration to all domestic or wild animals.

The term "premix carrier" refers to edible, non-toxic compositions suitable for incorporation in livestock feed, such as calcium carbonate, soybean mill run, rice mill hulls, wheat middlings, wheat bran, corn gluten, corn gluten meal, and other mill run byproducts. Note that some suitable premix carriers may also serve as "bases" within the practice of the invention. For example, one can formulate a composition of the invention using calcium carbonate as both the premix carrier and the base.

The term "protective coating" refers to a material which, when granulated with an acid-sensitive antibiotic ester and a suitable premix carrier, is capable of protecting said acid-sensitive antibiotic ester from the acidic conditions normally present in livestock feed. Exemplary protective coatings are hemicellulose mixtures (e.g., Masonex ®), reed lignin derivatives (e.g., Glutrin ®, Norilig ®, and Ameribond ®, available from Reed Lignin, Inc., Rothschild, Wis.), corn syrup solids, dextrose, starch, hydroxypropylmethylcellulose, methylcellulose, stearic acid, dextrans, cyclodextrans, or sucrose, particularly Masonex ® or reed lignin. The protective coating material is generally applied to a granulate comprising the premix carrier, antibiotic ester, and base. This may be accomplished by adding a slurry of protective coating material to the first granulate, or by mixing the first granulate with the protective coating material as a dry powder.

The term "sealant film" refers to an optional coating which may be applied to the granulated antibiotic ester-protective coating composition to provide further protection against acidic conditions. Exemplary sealant film materials are stearyl alcohol, glyceryl monostearate, sodium oleate, stearic acid, glyceryl monostearate, sodium caseinate, sorbitol, paraffin wax, petrolatum, mineral oil, gelatin, and the like. Sealant films are applied to the composition after the protective coating has been applied (e.g., the second granulate). The sealant film may be applied by dissolving the sealant film material in a volatile solvent (e.g., methanol), spraying the resulting solution over the second granulate, and drying the resulting composition to remove the volatile solvent. Alternatively, one can add the sealant film material to the second granulate as a solid, and gently heat the mixture to melt the sealant film material. The latter method is suitable for use with low-melting materials, e.g., materials which melt at temperatures of 60° C. or less, in order to avoid degrading the antibiotic ester.

The term "Masonex ®" refers to a hemicellulose extract by-product of Masonite board process. Masonex ® is a viscous, dark-colored syrup which is commonly about 50% mixed hemicelluloses and 50% water. Masonex ® is commercially available from Masonite Corporation.

PREPARATION

Compositions of the invention are prepared by the following procedures:

The antibiotic ester is first dispersed in an aqueous slurry of base. The resulting dispersion is then used to granulate the premix carrier. The resulting moist granulate is then air dried, followed by further granulation with a slurry of protective coating material. This second granulate is also dried, e.g., using warm air. If desired, one may apply a sealant film to this dried second granulate either by adding a methanol solution of the sealant while stirring the dried second granulate, or by simply mixing in solid sealant and applying enough heat to melt the sealant. The resulting sealed or unsealed second granulate can be mixed with animal feed at the appropriate concentration to produce an animal feed premix formulation suitable for administration to livestock.

Alternatively, one may granulate the premix carrier with a slurry of aqueous base. The resulting moist granulate is then air dried, followed by further granulation with a slurry of antibiotic ester mixed with the protective coating material. This second granulate is also dried, e.g., using warm air. If desired, one may apply a sealant film to this dried second granulate either by adding a methanol solution of the sealant while stirring the dried second granulate, or by simply mixing in solid sealant and applying enough heat to melt the sealant. The resulting sealed or unsealed second granulate can be mixed with animal feed at the appropriate concentration to produce an animal feed premix formulation suitable for administration to livestock.

One may also prepare the premix of the invention by fluid bed granulation. This is presently the preferred method of manufacture. For example, the antibiotic ester, carrier and base are mixed together and spread in a fluid bed reactor. The powder mixture is fluidized with air at about 80° C., and granulated with Masonex ® (the Masonex ® is diluted with water until an appropriate viscosity is obtained.) The mixture is granulated and dried in the fluid bed reactor for a total time of about 1-3 hours, at a bed temperature of about 20°-40° C.

The finished formulation should contain between about 0.001% and 25% antibiotic ester, 10% to about 40% base, about 10% to about 50% protective coating, about 0% to about 50% carrier, and 0% to about 8% sealant film. In formulations containing little or no carrier, the base is used in a granulated form and also plays the role of carrier.

Compositions of the invention may be prepared by other methods as well. A suitable method will produce a particulate premix composition wherein a suitable premix carrier mixed with an acid-sensitive antibiotic ester and a suitable base form the cores of the premix particles. These cores are coated in a layer of protective coating material, and optionally coated with an additional sealant film.

The following examples are presented for the purposes of illustration, and are not intended to limit the scope of the invention in any way.

EXAMPLE 1

(Formulations)

The following are exemplary formulations of the invention:

(A) Premix 1:

| Ingredient | Amount | |
|---|---|---|
| Laidlomycin propionate, K+ | 10.0 Kg | |
| Ca(OH)₂ | 20.0 Kg | |
| Masonex ® (pH adjusted to 12) | 30.0 Kg | (solid wt) |
| CaCO₃ | 10.0 Kg | |
| Soybean mill run q.s. | 100.0 Kg | |

The laidlomycin propionate potassium salt is dispersed in an aqueous slurry of Ca(OH)₂. The resulting dispersion is then used to granulate the CaCO₃. The resulting moist granulate is then air dried, followed by further granulation with a slurry of Masonex ®. This second granulate is also dried using warm air to form a premix composition of the invention.

This premix is then mixed with Cali ® Chick Mash in a ratio of 1:1,000 to form a finished feed suitable for administration to livestock, particularly chickens, turkeys, and ducks.

(B) Premix 2:

| Ingredient | Amount | |
|---|---|---|
| Laidlomycin propionate, K+ | 5.0 g | |
| Ca(OH)₂ | 9.0 g | |
| Masonex ® (pH adjusted to 12) | 10.0 g | (solid wt) |

-continued

| Ingredient | Amount |
|---|---|
| Stearyl alcohol | 5.0 g |
| Soybean mill run q.s. | 50.0 g |

The soybean mill run is first granulated with a slurry of aqueous Ca(OH)₂. The resulting moist granulate is then air dried, followed by further granulation with a slurry of laidlomycin propionate potassium salt and Masonex ®. This second granulate is also dried using warm air. Next, a sealant film is applied to this dried second granulate by adding a methanol solution stearyl alcohol while stirring the dried second granulate, then drying with warm air to remove the methanol.

The resulting sealed second granulate is mixed with animal feed at a ratio of about 1:1,000 to produce an animal feed premix formulation suitable for administration to livestock.

(C) Fluid Bed Premix:

| Ingredient | Amount | |
|---|---|---|
| Laidlomycin propionate, Na+ | 595.2 g | |
| Ca(OH)₂ | 1800.0 g | |
| Masonex ® (pH adjusted to 12) | 2400.0 g | (solid wt) |
| Petrolatum | 240.0 g | |
| Soybean mill run | 964.8 g | |

The laidlomycin propionate sodium salt, Ca(OH)₂, and soybean mill run are weighed and mixed in a fluid bed unit for 5-10 minutes. The Masonex ® solution is adjusted to pH 12 using NaOH, and is sprayed into the unit to granulate the dry mixture. The resulting granulate is then dried in the unit until the moisture is reduced to about 5-6%. Then, the petrolatum (or optionally mineral oil #35) is melted by heating to 70°-75° C., and sprayed on the dried granulate. (Petrolatum or mineral oil serves as a tackifier to prevent settling of the premix in the final feed formulation.) The tackifier may alternatively be added in a planetary mixer. The premix thus prepared is approximately the same density as animal feed, and so resists settling and segregation.

The resulting premix is mixed with animal feed at a ratio of about 1:1,000 to produce an animal feed premix formulation suitable for administration to livestock, particularly cattle. Alternatively, the premix may be diluted about 1:500 to produce an animal feed premix formulation suitable for administration to livestock such as swine.

EXAMPLE 2

(Stability Study)

Test compositions were prepared as follows:

| Ingredient | Composition: | Concentration | | |
|---|---|---|---|---|
| | | A | B | C |
| Laidlomycin Propionate K+ | | 10% | 10% | 10% |
| CaCO₃ | | 30% | 30% | 20% |
| 50% Masonex ® (pH 10) | | 0% | 30% | 0% |
| Stearic acid | | 0% | 0% | 10% |
| Soybean mill run | | qs | qs | qs |

Composition A was prepared by first mixing the soybean mill run with an aqueous slurry of CaCO₃, then an aqueous slurry of laidlomycin propionate potassium salt. The resulting composition was granulated and air-dried.

Composition B was prepared by first mixing the soybean mill run with an aqueous slurry of $CaCO_3$. The laidlomycin propionate K+ was then dispersed in the Masonex® and the dispersion extended into the soybean mill run/$CaCO_3$ blend. The resulting mixture was dried to 11% moisture.

Composition C was prepared by dispersing $CaCO_3$ and laidlomycin propionate K+ in liquid stearic acid (50°–55° C.). The dispersion was allowed to congeal, milled, and mixed with soybean mill run.

Each of these compositions was then blended with chicken feed at a ratio of 1:1,000, and sealed in glass bottles. The bottles were stored at 40° C. for three months, opened, and the percentage laidlomycin propionate potassium salt (LP) remaining was determined. The results are set out in Table I.

TABLE I

| Composition | Percent LP (+/− SD) | |
|---|---|---|
| | initial | final |
| A | 97.0 ± 2.6 | 32.0 ± 1.7 |
| B | 91.0 ± 6.2 | 60.0 ± 2.8 |
| C | 108.0 ± 6.7 | 32.0 ± 4.0 |

These results indicate that the compositions of the invention significantly increase the stability of pH-sensitive antibiotic esters.

What is claimed is:

1. A granulated feed premix composition with enhanced storage stability, wherein said composition is useful for enhancing feed efficiency or for treating coccidial infection in livestock, and wherein said granules comprise:
   (a) a core comprising a mixture of an effective amount of about 0.001% to 25% by weight laidiomycin acylate or a veterinarily acceptable salt thereof, about 10% to about 40% by weight of a veterinarily acceptable base sufficient to raise the pH of said granule to between about 8 and about 12, and 0% to about 50% by weight of a suitable premix carrier;
   (b) about 10% to about 50% by weight of a suitable protective coating material sufficient to coat said core; and
   (c) 0% to about 8% by weight of a veterinarily acceptable sealant film material sufficient to coat said granules.

2. A premix composition of claim 1 wherein said granules comprise:
   (a) a core comprising a mixture of about 5% to 20% by weight laidlomycin acylate or a veterinarily acceptable salt thereof, about 25% to about 40% by weight base, and 0% to about 50% by weight premix carrier;
   (b) about 30% to about 40% by weight protective coating material; and
   (c) 0% to about 8% by weight sealant film material.

3. A premix composition of claim 2 wherein said laidlomycin acylate or a veterinarily acceptable salt thereof is an alkali metal or alkaline earth salt of laidlomycin propionate.

4. A premix composition of claim 2 wherein said base is calcium hydroxide, sodium hydroxide, or potassium hydroxide.

5. A premix composition of claim 2 wherein said premix carrier is soybean mill run or calcium carbonate.

6. A premix composition of claim 2 wherein said protective coating material is lignosulfonate, hemicellulose, starch or sucrose.

7. A premix composition of claim 6 wherein said protective coating material is hemicellulose.

8. A premix composition of claim 2 wherein said sealant film material is stearyl alcohol or glyceryl monostearate.

9. A premix composition of claim 2 wherein said granules further comprise an amount of base sufficient to raise the pH of said protective coating to about 12.

10. A premix composition of claim 2 wherein said granules comprise:
    (a) a core comprising a mixture of about 5% to about 20% by weight laidlomycin propionate potassium salt, about 30% to about 40% by weight $Ca(OH)_2$, and 0% to about 50% by weight soybean mill run;
    (b) about 30% to about 40% (dry weight) by weight hemicellulose; and
    (c) 0% to about 8% by weight stearyl alcohol.

11. The premix composition of claim 10 wherein said granules further comprise an amount of base sufficient to raise the pH of said hemicellulose to about 12.

12. A method for preparing a granulated animal feed premix composition with enhanced storage stability, wherein said premix composition is useful for enhancing feed efficiency or for treating coccidial infection in livestock, which method comprises:
    (a) mixing an effective amount of a laidlomycin acylate or a veterinarily acceptable salt thereof, an amount of a veterinarily acceptable base sufficient to raise the pH of said premix composition to between about 8 and about 12, and, optionally, a suitable premix carrier to form a core mixture;
    (b) coating said core mixture with an amount of a protective coating material sufficient to form granules; and
    (c) optionally coating said granules with an amount of veterinarily acceptable sealant film material sufficient to coat said granules.

13. A method of claim 12 which comprises:
    (a) mixing about 0.001% to 25% by weight laidlomycin acylate or a veterinarily acceptable salt thereof, about 10% to about 40% by weight base, and 0% to about 50% by weight premix carrier to form a core mixture;
    (b) coating said core mixture with about 10% to about 50% by weight protective coating material to form granules; and
    (c) coating said granules with 0% to about 8% by weight sealant film material.

14. A method of claim 13 which comprises:
    (a) mixing about 5% to 20% by weight laidlomycin acylate or a veterinarily acceptable salt thereof, about 25% to about 40% by weight base, and 0% to about 50% by weight premix carrier to form a core mixture;
    (b) coating said core mixture with about 30% to about 40% by weight protective coating material to form granules; and
    (c) coating said granules with 0% to about 8% by weight sealant film material.

15. A method of claim 14 which comprises:
    (a) mixing about 5% to about 20% by weight laidlomycin propionate potassium salt, about 30% to about 40% by weight $Ca(OH)_2$, and 0% to about 50% by weight soybean mill run;

(b) coating said core mixture with about 30% to about 40% (dry weight) by weight hemicellulose to form granules; and (c) coating said granules with 0% to about 8% by weight stearyl alcohol.

16. A method of claim 15 wherein the pH of said hemicellulose is adjusted to about 12.

17. The method of claim 16 wherein said granules are prepared by fluid bed granulation.

18. A method of enhancing feed efficiency or treating coccidial infection in livestock, which method comprises orally administering to livestock in need thereof a feed comprising a granulated animal feed premix composition, wherein granules of said premix composition comprise:

(a) a core comprising a mixture of an effective amount of a laidlomycin acylate or a veterinarily acceptable salt thereof, an amount of veterinarily acceptable base sufficient to raise the pH of said granules to between about 8 and about 12, and, optionally, a suitable premix carrier;

(b) an amount of suitable protective coating material sufficient to coat said core to form said granules; and (c) optionally, an amount of veterinarily acceptable sealant material sufficient to coat said granules.

19. A method of claim 18 wherein said granules comprise:

(a) a core comprising a mixture of about 0.001% to 25% by weight laidlomycin acylate or a veterinarily acceptable salt thereof, about 10% to about 40% by weight base, and 0% to about 50% by weight premix carrier;

(b) about 10% to about 50% by weight protective coating material; and (c) 0% to about 8% by weight sealant film material.

20. A method of claim 19 wherein said granules comprise:

(a) a core comprising a mixture of about 5% to 20% by weight laidlomycin acylate or a veterinarily acceptable salt thereof, about 25% to about 40% by weight base, and 0% to about 50% by weight premix carrier;

(b) about 30% to about 40% by weight protective coating material; and (c) 0% to about 8% by weight sealant film material.

21. A method of claim 20 wherein said granules comprise:

(a) a core comprising a mixture of about 5% to about 20% by weight laidlomycin propionate potassium salt, about 30% to about 40% by weight $Ca(OH)_2$, and 0% to about 50% by weight soybean mill run;

(b) about 30% to about 40% (dry weight) by weight hemicellulose; and (c) 0% to about 8% by weight stearyl alcohol.

22. The method of claim 21 wherein said granules further comprise an amount of base sufficient to adjust the pH of said hemicellulose to about 12.

* * * * *